(12) United States Patent
Eiselt et al.

(10) Patent No.: US 7,840,139 B2
(45) Date of Patent: Nov. 23, 2010

(54) SINGLE FIBER DUPLEX OPTICAL TRANSPORT

(76) Inventors: Michael H. Eiselt, 250 Martin Pl., Middletown, NJ (US) 07748; Lara Garrett, 23 Irving Pl., Red Bank, NJ (US) 07701; Marvin R. Young, 4601 Deer Valley La., Richardson, TX (US) 75082

(*) Notice: Subject to any disclaimer, the term of this patent is extended or adjusted under 35 U.S.C. 154(b) by 111 days.

(21) Appl. No.: 12/183,695

(22) Filed: Jul. 31, 2008

(65) Prior Publication Data

US 2008/0285982 A1    Nov. 20, 2008

Related U.S. Application Data

(62) Division of application No. 10/737,136, filed on Dec. 15, 2003, now Pat. No. 7,421,207.

(60) Provisional application No. 60/433,305, filed on Dec. 13, 2002.

(51) Int. Cl.
*H04B 10/00* (2006.01)

(52) U.S. Cl. ............... 398/159; 398/158; 398/142; 398/147; 398/148

(58) Field of Classification Search ......... 398/141–147, 398/158–159
See application file for complete search history.

(56) References Cited

U.S. PATENT DOCUMENTS 4,229,831 A    10/1980    Lacher

| | | |
|---|---|---|
| 4,535,459 A | 8/1985 | Hogge |
| 4,636,589 A | 1/1987 | Lee |
| 4,710,022 A | 12/1987 | Soeda et al. |
| 5,218,662 A * | 6/1993 | Dugan .................. 385/123 |
| 5,224,183 A | 6/1993 | Dugan |
| 5,225,922 A | 7/1993 | Chraplyvy et al. |
| 5,267,071 A | 11/1993 | Little et al. |
| 5,299,048 A | 3/1994 | Suyama |
| 5,321,541 A | 6/1994 | Cohen |
| 5,351,146 A | 9/1994 | Chan et al. |
| 5,452,124 A | 9/1995 | Baker |
| 5,455,703 A | 10/1995 | Duncan et al. |

(Continued)

FOREIGN PATENT DOCUMENTS

JP    01115230    5/1989

(Continued)

OTHER PUBLICATIONS

Lee et al., "Low-Cost Bidirectional Optical Amplifier Using a Unidirectional Er-Doped Fiber Amplifier and a Fiber Mach0Sehnder Interferometer," *IEEE Photonics Technology Letters*, 2001, 13(1), 76-78.

(Continued)

*Primary Examiner*—Agustin Bello
(74) *Attorney, Agent, or Firm*—Woodcock Washburn LLP

(57) ABSTRACT

The invention pertains to optical fiber transmission systems, and is particularly relevant to optical transport systems employing optical amplifiers. In particular the invention teaches an apparatus and method that allows cost effective co-directional operation of an optical amplifier to support full duplex traffic on a single fiber, and the design of an optical fiber transmission system based on this optical amplifier technology.

35 Claims, 4 Drawing Sheets

U.S. PATENT DOCUMENTS

| | | | |
|---|---|---|---|
| 5,528,582 | A | 6/1996 | Bodeep et al. |
| 5,559,625 | A | 9/1996 | Smith et al. |
| 5,600,468 | A | 2/1997 | Barber |
| 5,608,562 | A * | 3/1997 | Delavaux et al. ............ 398/148 |
| 5,613,210 | A | 3/1997 | Van Driel et al. |
| 5,726,784 | A | 3/1998 | Alexander et al. |
| 5,737,118 | A | 4/1998 | Sugaya et al. |
| 5,740,289 | A | 4/1998 | Glance |
| 5,742,416 | A | 4/1998 | Mizrahi |
| 5,778,116 | A | 7/1998 | Tomich |
| 5,808,785 | A | 9/1998 | Nakabayashi |
| 5,812,290 | A | 9/1998 | Maeno et al. |
| 5,812,306 | A | 9/1998 | Mizrahi |
| 5,825,949 | A | 10/1998 | Choy et al. |
| 5,877,881 | A | 3/1999 | Miyauchi et al. |
| 5,886,801 | A | 3/1999 | Van Deventer et al. |
| 5,903,613 | A | 5/1999 | Ishida |
| 5,914,794 | A | 6/1999 | Fee et al. |
| 5,914,799 | A | 6/1999 | Tan |
| 5,936,753 | A | 8/1999 | Ishikawa |
| 5,940,209 | A | 8/1999 | Nguyen |
| 5,940,456 | A | 8/1999 | Chen et al. |
| 5,963,350 | A | 10/1999 | Hill |
| 5,963,361 | A | 10/1999 | Taylor et al. |
| 5,995,259 | A | 11/1999 | Meli et al. |
| 5,995,694 | A | 11/1999 | Akasaka et al. |
| 6,005,402 | A | 12/1999 | Grasso |
| 6,005,991 | A | 12/1999 | Knasel |
| 6,005,997 | A * | 12/1999 | Robinson et al. ............... 385/24 |
| 6,021,245 | A * | 2/2000 | Berger et al. ................ 385/123 |
| 6,038,062 | A | 3/2000 | Kosaka |
| 6,075,634 | A | 6/2000 | Casper et al. |
| 6,078,414 | A | 6/2000 | Iwano |
| 6,081,359 | A | 6/2000 | Takehana et al. |
| 6,081,360 | A | 6/2000 | Ishikawa et al. |
| 6,084,695 | A | 7/2000 | Martin et al. |
| 6,088,152 | A | 7/2000 | Berger et al. |
| 6,108,074 | A | 8/2000 | Bloom |
| 6,111,675 | A | 8/2000 | Mao et al. |
| 6,122,095 | A | 9/2000 | Fatehi |
| 6,151,334 | A | 11/2000 | Kim et al. |
| 6,157,477 | A | 12/2000 | Robinson |
| 6,160,614 | A | 12/2000 | Unno |
| 6,163,392 | A | 12/2000 | Condict et al. |
| 6,163,636 | A | 12/2000 | Stentz et al. |
| 6,172,802 | B1 | 1/2001 | D'Auria et al. |
| 6,173,094 | B1 | 1/2001 | Bowerman et al. |
| 6,177,985 | B1 | 1/2001 | Bloom |
| 6,198,559 | B1 | 3/2001 | Gehlot |
| 6,229,599 | B1 | 5/2001 | Galtarossa |
| 6,236,481 | B1 | 5/2001 | Laor |
| 6,236,499 | B1 | 5/2001 | Berg et al. |
| 6,246,510 | B1 | 6/2001 | BuAbbud et al. |
| 6,259,553 | B1 | 7/2001 | Kinoshita |
| 6,259,554 | B1 | 7/2001 | Shigematsu et al. |
| 6,259,693 | B1 | 7/2001 | Ganmukhi et al. |
| 6,259,845 | B1 | 7/2001 | Sardesai |
| 6,272,185 | B1 | 8/2001 | Brown |
| 6,275,315 | B1 | 8/2001 | Park et al. |
| 6,288,811 | B1 | 9/2001 | Jiang et al. |
| 6,288,813 | B1 | 9/2001 | Kirkpatrick et al. |
| 6,301,340 | B1 | 10/2001 | Sansom et al. |
| 6,307,656 | B2 | 10/2001 | Terahara |
| 6,317,231 | B1 | 11/2001 | Al-Salameh et al. |
| 6,317,255 | B1 | 11/2001 | Fatehi et al. |
| 6,320,687 | B1 * | 11/2001 | Ishikawa .................... 398/147 |
| 6,323,950 | B1 | 11/2001 | Kim et al. |
| 6,327,060 | B1 | 12/2001 | Otani et al. |
| 6,327,062 | B1 | 12/2001 | King et al. |
| 6,330,381 | B1 * | 12/2001 | Lu et al. ...................... 385/24 |
| 6,356,384 | B1 | 3/2002 | Islam |
| 6,359,729 | B1 | 3/2002 | Amuroso |
| 6,388,801 | B1 | 5/2002 | Sugaya et al. |
| 6,393,188 | B1 * | 5/2002 | Jeong et al. .................. 385/123 |
| 6,396,853 | B1 | 5/2002 | Humphrey et al. |
| 6,411,407 | B1 | 6/2002 | Maxham |
| 6,417,961 | B1 * | 7/2002 | Sun et al. .................. 359/337.5 |
| 6,438,286 | B1 | 8/2002 | Duerksen et al. |
| 6,480,312 | B1 | 11/2002 | Okuno et al. |
| 6,493,117 | B1 | 12/2002 | Milton et al. |
| 6,519,060 | B1 | 2/2003 | Liu |
| 6,519,082 | B2 | 2/2003 | Ghera et al. |
| 6,724,482 | B2 * | 4/2004 | Wu ............................ 356/450 |
| 6,757,098 | B2 | 6/2004 | Berg et al. |
| 6,888,671 | B2 | 5/2005 | Joo et al. |
| 6,965,738 | B2 * | 11/2005 | Eiselt et al. ................. 398/148 |
| 7,034,994 | B2 * | 4/2006 | McNicol .................. 359/337.5 |
| 7,054,555 | B2 | 5/2006 | Maeno |
| 7,292,790 | B1 * | 11/2007 | Sardesai ..................... 398/148 |
| 7,394,993 | B2 | 7/2008 | Sekiya et al. ............... 398/201 |
| 7,471,858 | B2 * | 12/2008 | Guo et al. ..................... 385/16 |
| 7,512,343 | B2 * | 3/2009 | Sridhar et al. .............. 398/147 |
| 2001/0005271 | A1 | 6/2001 | Leclerc et al. |
| 2001/0007605 | A1 * | 7/2001 | Inagaki et al. ............... 385/123 |
| 2001/0009468 | A1 * | 7/2001 | Fee ............................. 359/161 |
| 2001/0014104 | A1 | 8/2001 | Bottorff et al. |
| 2001/0048799 | A1 | 12/2001 | King et al. |
| 2001/0053161 | A1 | 12/2001 | Tomizawa et al. |
| 2002/0008913 | A1 | 1/2002 | Yin et al. |
| 2002/0009060 | A1 | 1/2002 | Gross |
| 2002/0012152 | A1 | 1/2002 | Agazzi et al. |
| 2002/0015220 | A1 | 2/2002 | Papernyl et al. |
| 2002/0027703 | A1 | 3/2002 | Kinoshita et al. |
| 2002/0034197 | A1 | 3/2002 | Tornetta et al. |
| 2002/0044317 | A1 | 4/2002 | Gentner et al. |
| 2002/0044324 | A1 | 4/2002 | Hoshida et al. |
| 2002/0048287 | A1 | 4/2002 | Silvers |
| 2002/0051468 | A1 | 5/2002 | Ofek et al. |
| 2002/0063948 | A1 | 5/2002 | Islam et al. |
| 2002/0064181 | A1 | 5/2002 | Ofek et al. |
| 2002/0075903 | A1 | 6/2002 | Hind |
| 2002/0080809 | A1 | 6/2002 | Nicholson et al. |
| 2002/0118446 | A1 | 8/2002 | Lee et al. |
| 2002/0141048 | A1 | 10/2002 | Spock et al. |
| 2002/0181037 | A1 | 12/2002 | Lauder et al. |
| 2003/0002776 | A1 | 1/2003 | Graves et al. |
| 2003/0016705 | A1 | 1/2003 | Bellato et al. |
| 2003/0026533 | A1 * | 2/2003 | Danziger et al. .............. 385/27 |
| 2003/0055998 | A1 | 3/2003 | Saha et al. |
| 2003/0067655 | A1 | 4/2003 | Pedersen et al. |
| 2004/0001715 | A1 | 1/2004 | Katagiri et al. |
| 2004/0037568 | A1 * | 2/2004 | Evangelides, Jr. ........... 398/159 |
| 2006/0093369 | A1 * | 5/2006 | Nagarajan ................... 398/135 |
| 2006/0127099 | A1 * | 6/2006 | Eiselt et al. ................. 398/148 |
| 2007/0122158 | A1 * | 5/2007 | Eiselt et al. ................. 398/147 |

FOREIGN PATENT DOCUMENTS

| | | |
|---|---|---|
| JP | 02238736 | 9/1990 |

OTHER PUBLICATIONS

United States Patent and Trademark Office: Non-Final Office Action dated Oct. 10, 2006, U.S. Appl. No. 10/454,712, 11 pages.

United States Patent and Trademark Office: Final Office Action dated Jun. 6, 2007, U.S. Appl. No. 10/454,712, 13 pages.

United States Patent and Trademark Office: Non-final Office Action dated Feb. 13, 2008, U.S. Appl. No. 10/454,712, 13 pages.

* cited by examiner

SINGLE FIBER DUPLEX OPTICAL TRANSPORT

CROSS-REFERENCE TO RELATED APPLICATIONS

This application is a division of U.S. application Ser. No. 10/737,136, filed Dec. 15, 2003, which claims benefit under 35 U.S.C. §119(e) of U.S. Provisional Application No. 60/433,305, filed Dec. 13, 2002, the disclosures of which are hereby incorporated by reference herein in their entireties.

TECHNICAL FIELD

The invention pertains to optical fiber transmission systems, and is particularly relevant to optical transport systems employing optical amplifiers. In particular the invention teaches an apparatus and method that allows cost effective co-directional operation of an optical amplifier to support full duplex traffic.

BACKGROUND

A goal of many modern long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. An external modulation device may also be used with an advantage of higher performance, and a disadvantage of high cost. After binary modulation, a high bit may be transmitted as an optical signal level with more power than the optical signal level in a low bit. Often, the optical signal level in a low bit is engineered to be equal to, or approximately equal to zero optical power. In addition to binary modulation, the data can be transmitted with multiple levels, although in current optical transport systems, a two level binary modulation scheme is predominantly employed.

Typical long haul optical transport dense wavelength division multiplexed (DWDM) systems transmit 40 to 80 10 Gbps (gigabit per second) channels across distances of 1000 to 3000 kilometers (km) in a single 35 nanometer (nm) band of optical spectrum. A duplex optical transport system is one in which traffic is both transmitted and received between parties at opposite end of the link. In current DWDM long haul transport systems transmitters, different channels operating at distinct carrier frequencies are multiplexed onto one fiber using a multiplexer. Such multiplexers may be implemented using array waveguide (AWG) technology or thin film technology, or a variety of other technologies. After multiplexing, the optical signals are coupled into the transport fiber for transmission to the receiving end of the link.

At the receiving end of the link, the optical channels are de-multiplexed using a de-multiplexer. Such de-multiplexers may be implemented using array waveguide (AWG) technology or thin film technology, or a variety of other technologies. Each channel is then optically coupled to separate optical receivers. The optical receiver is typically comprised of a semiconductor photodetector and accompanying electronics.

The total link distance in today's optical transport systems may be two different cities separated by continental distances, from 1000 km to 6000 km, for example. To successfully bridge these distances with sufficient optical signal power relative to noise, the total fiber distance is separated into fiber spans, and the optical signal is periodically amplified using an in-line optical amplifier after each fiber span. Typical fiber span distances between optical amplifiers are 50-100 km. Thus, for example, thirty 100 km spans would be used to transmit optical signals between points 3000 km apart. Examples of in-line optical amplifiers include erbium doped fiber amplifiers (EDFAs), lumped Raman amplifiers and semiconductor optical amplifiers (SOAs).

A duplex optical transport system is one in which voice and data traffic are transmitted and received between parties at opposite ends of the link. There are several architectures that support duplex operation in fiber optical transport systems. Each suffers from limitations.

For example, it is known in the art to use a pair of fiber strands to support duplex operation. One fiber strand of the fiber pair supports traffic flow from a first city to a second city while the second strand of the fiber pair supports traffic flow from a second city to a first city. Each strand is comprised of separate optical amplifiers. At low channel counts, this configuration suffers from a limitation in that the system still demands a large number of optical amplifiers that could potentially be twice the amount needed.

In a conventional two-fiber optical transport system, data is sent from location A to location Z and vice versa using two different fibers. This requires in-line optical amplifiers, dispersion compensation modules (DCMs), dynamic gain equalizers (DGE) and other equipment for each transmission direction.

A conventional single-fiber transport system carries the two directions of data traffic in both directions over the same fiber, using different wavelengths for the two directions. However, the signals from different directions are separated at amplifier sites and amplified by separate amplifiers. Also, dispersion compensation and power equalization are performed separately for each direction. While the transmission capacity of this one-fiber system is reduced by a factor of one half as compared to the two-fiber system, only the required amount of fiber is reduced, while the amount of transmission equipment stays the same or is even increased due to the required splitting and combining modules.

In a conventional single-fiber system, signals in both traffic directions share one fiber, as opposed to traveling on a fiber pair in a two-fiber system. At the in-line amplifier (ILA) sites, the different traffic directions are typically separated and independently amplified. An additional feature of the single-fiber transport system of this disclosure is the use of a single optical amplifier and DCM for both traffic directions. Additionally, the dynamic gain equalizers (DGEs) can be shared between the traffic directions. This enables cost savings on the equipment side, as the amount of modules (EDFAs, DCMs, DGEs) is virtually reduced by a factor of 2. These cost savings are realized for the first installed channel. In addition, the use of a single fiber provides operational cost savings.

In U.S. Pat. Nos. 5,742,416 and 5,812,306 Mizrahi teaches a single fiber bidirectional WDM optical communication system with bi-directional optical amplifiers, where the two traffic directions travel in opposite directions through the optical amplifier. The use of a bi-directional optical amplifier, for example, a bi-directional EDFA to support duplex operation using a single strand of optical fiber potentially saves the cost of one amplifier at each ILA site. A limitation of this prior art implementation is that the bidirectional EDFA may begin to lase in addition to providing amplification. These oscillations and instabilities defeat the goal of data transmission. Keeping the bi-directional EDFA from lasing typically carries additional engineering and financial costs, and ultimately limits the reach and capacity of the transport system. It is desirable to use a single amplifier to support duplex operation without the penalties of a bi-directional EDFA.

In U.S. Pat. No. 5,452,124, Baker teaches a device which uses a four-port wavelength division multiplexing filter and a single erbium doped optical amplifier to implement a dual wavelength bidirectional optical amplifier module. However, the limitation of this prior art implementation is that there is no power balance between incoming and outgoing signals, no provision for optical add/drop multiplexers and no implementation or tuning of dispersion compensation modules.

SUMMARY

In the present invention, a single fiber duplex transmission system is described, in which most of the intermediary components, for examples, optical amplifiers, dispersion compensation modules, and gain equalizers are shared between the transmission directions. This architecture reduces the amount of equipment by half, and therefore implies a reduction of cost and space and power requirements by about 50%. The improvements reduce the number of optical amplifiers in a duplex optical transport system without suffering the penalties present in bi-directional optical amplifiers. The improvements also include a power balance for incoming and outgoing signals of different strengths.

In one aspect of the invention, a multiplexing and de-multiplexing architecture to achieve duplex operation in a single fiber optical transport system through co-directional operation of each optical amplifier is taught.

In another aspect of the invention, an optical add/drop multiplexer architecture to achieve duplex operation in a single fiber optical transport system through co-directional operation of each optical amplifier is taught.

In another aspect of the invention, a module for signal combination and separation in in-line amplifier and optical add/drop multiplexer sites to achieve duplex operation in a single fiber optical transport system through co-directional operation of each optical amplifier is taught.

In another aspect of the invention, a method for power equalization to achieve duplex operation in a single fiber optical transport system through co-directional operation of each optical amplifier is taught.

In another aspect of the invention, a method and strategy for shared dispersion compensation to achieve duplex operation in a single fiber optical transport system through co-directional operation of each optical amplifier is taught.

In another aspect of the invention, a method for full-duplex optical supervisory channel (OSC) over single fiber to achieve duplex operation in a single fiber optical transport system through co-directional operation of each optical amplifier is taught.

In another aspect of the invention, a method of automatically tuning the system operating conditions and power equalization to achieve duplex operation in a single fiber optical transport system through co-directional operation of each optical amplifier is taught.

In another aspect of the invention, a method adding higher capacity to the system to achieve duplex operation in a single fiber optical transport system through co-directional operation of each optical amplifier is taught.

In another aspect of the invention, a simplified add/drop architecture to achieve duplex operation in a single fiber optical transport system through co-directional operation of each optical amplifier is taught.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF ILLUSTRATIVE EMBODIMENTS

While the making and using of various embodiments of the present invention are discussed in detail below, it should be appreciated that the present invention provides many applicable inventive concepts that can be embodied in a wide variety of specific contexts. The specific embodiments described herein are merely illustrative of specific ways to make and use the invention and do not delimit the scope of the invention.

Figure 1:
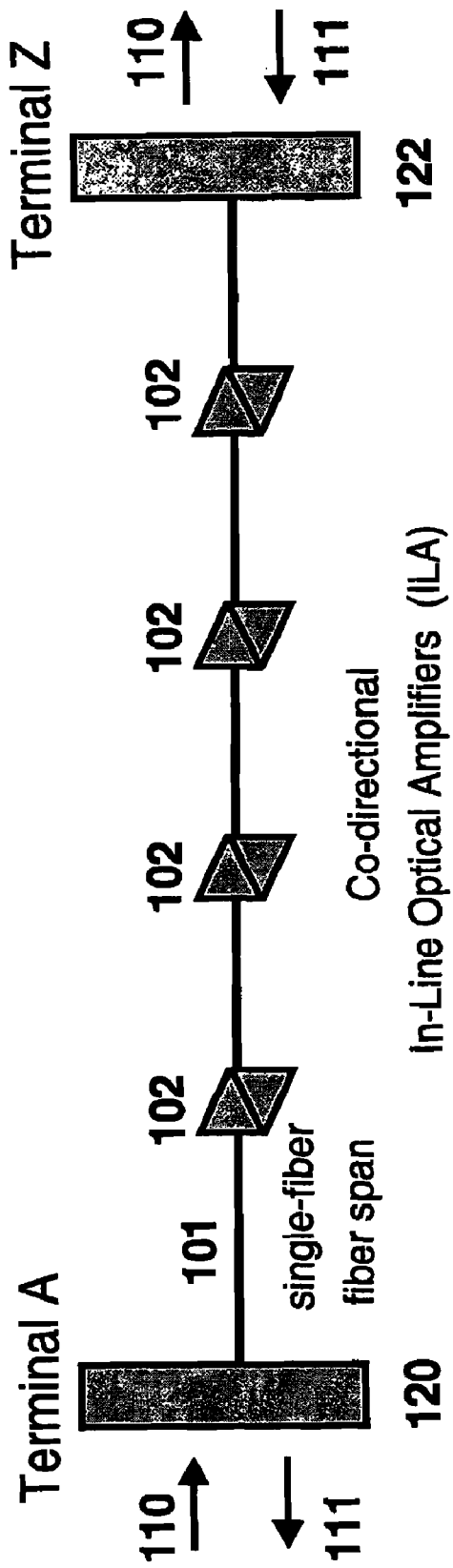
FIG. 1 is a schematic illustration of a full duplex single fiber system in accordance with the invention.

In FIG. 1 is shown a block diagram of a full duplex single fiber optical transport system with shared components in accordance with the invention. The single fiber spans 101 connect in-line amplifier (ILA) stations 102. Together a chain of fiber spans 101 and in-line amplifier stations 102 connect terminal A, 120 and terminal Z, 122. The notation A and Z is a commonly used notation to indicate different geographic locations. Terminal A transmits optical signal 110 and receives optical signal 111. Terminal Z transmits optical signal 111 and receives optical signal 110. Optical signals 110 and 111 propagate in opposite directions, or counter-propagate, in the single fiber spans 101. In accordance with this invention, optical signals 110 and 111 co-propagate through the in-line amplifiers.

Single fiber spans 101 may be realized by fiber optic strands, wherein the optical fiber is single-mode silica glass fiber such as SMF-28, LEAF or other fiber types. This fiber is typically jacketed and cabled for protection and mechanical ruggedness. In-line amplifier stations 102 will be discussed in more detail below in conjunction with FIG. 2, however, inline amplifier stations 102 typically comprise optical amplifiers, variable optical attenuators, wavelength selective optical couplers, and may also contain dispersion compensators, dynamic gain equalizers and optical add/drop multiplexers.

Optical signals 110 and 111 are typically comprised optical energy that is encoded with the data or information to be transmitted between geographic locations A and Z. The optical energy is typically generated by semiconductor diode lasers of precise frequencies as specified by the International Telecommunications Union recommendation (G.692 (ITU grid). All possible wavelength ranges are contemplated by the invention; however the preferred embodiments specifically include wavelength ranges in the "C" and "L" bands. At terminals 120 and 122, these different frequencies are multiplexed together before transmission and de-multiplexed apart at the receiving terminal. Optical signals 110 and 111 may be wavelength division multiplexed (WDM) signals.

Figure 2:
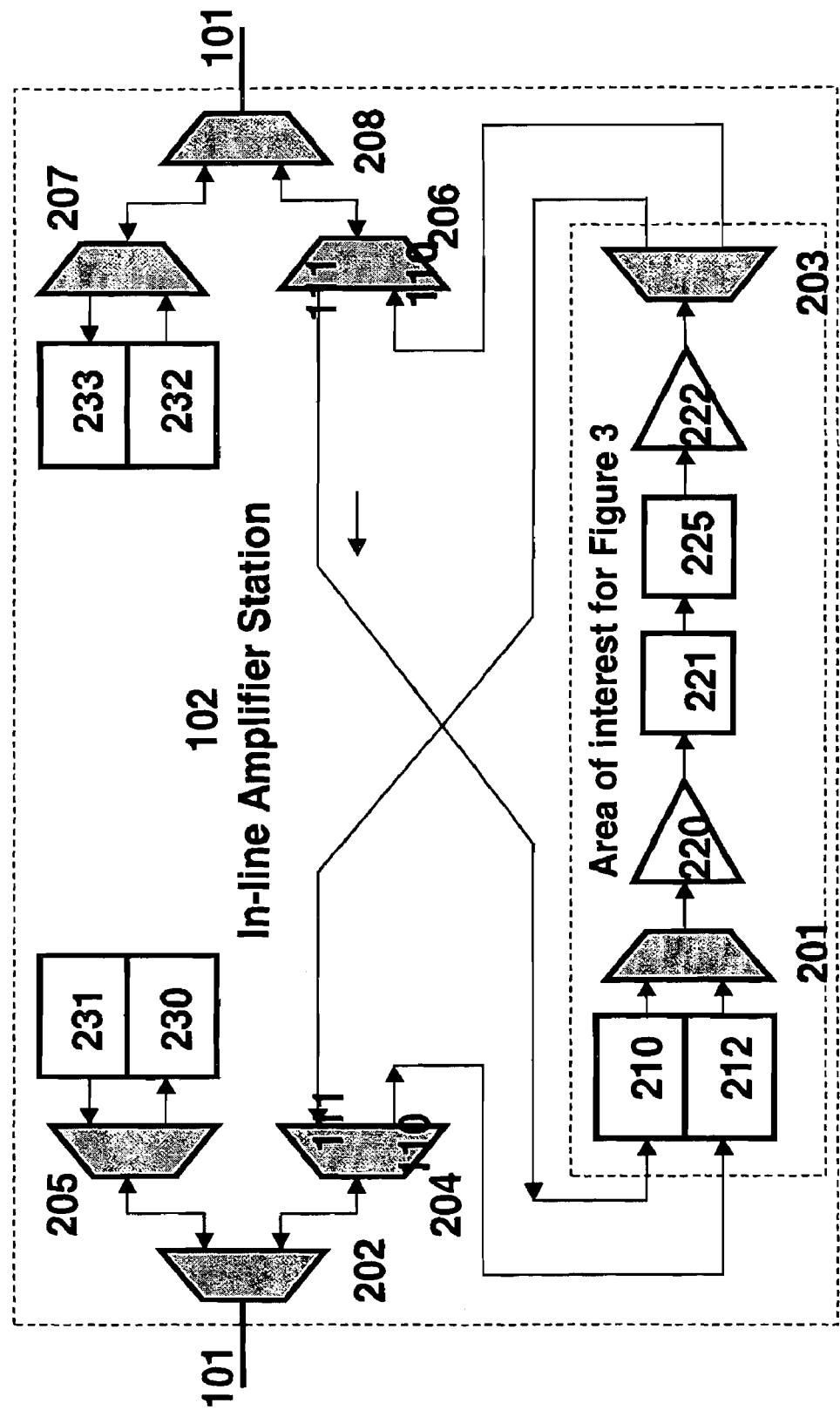
FIG. 2 is a schematic illustration of an inline optical amplifier to support the full duplex single fiber system in accordance with the invention.

In FIG. 2 is shown a block diagram of a typical in-line amplifier station 102 in accordance with the invention. The in-line amplifier station comprises a functional arrangement of optical components that serves to amplify the optical signals between spans. Shown in FIG. 2 for contextual reference are neighboring fiber spans 101, which carry optical signal 110 and 111.

Also shown in FIG. 2 are optical couplers 201 and 203, and optical coupler/decouplers 204 and 206. In general, optical 201, 203, 204, and 206 referred to as optical couplers and are selected and positioned to enable optical signals 110 and 111 to counter-propagate in fiber spans 101, and to co-propagate in the optical components comprising in-line amplifier station 102. In a preferred embodiment, optical couplers 201, 203, 204 and 206 are wavelength-selective optical couplers. In a preferred embodiment, the wavelength-selective optical couplers may be realized as a thin film optical coupler. In an alternate preferred embodiment, the wavelength selective optical coupler may be implemented as an inter-leaver, which may be realized as an etalon, or with birefringent crystals, or other inter-leaver technology.

Also shown in FIG. 2 are optical attenuator 210 and optical attenuator 212. In a preferred embodiment, optical attenuator 210 and 212 are implemented as variable optical attenuators, which may be realized using a number of technologies, including micro-electromechanical machines (MEMS) variable optical attenuators, thermo-optic based variable optical attenuators, traditional mechanical variable optical attenuators, or other variable optical attenuator technology. The use of four separate couplers 201,203, 204 and 206 rather than a single coupler structure to separate and recombine the optical signals between the fiber spans 101 and the optical amplifier stages 220 and 222 is an inventive concept that provides greater optical isolation between the signals 110 and 111 to prevent optical signal degradation effects, and further provides a location for the optical attenuators 210 and 212 to separately adjust the optical power in signals 110 and 111 at the input of the optical amplifier.

Also shown in FIG. 2 is an optical amplifier having stages 220 and 222. Optical amplifier stages 220 and 222 amplify optical signals 110 and 111 in a co-directional manner in order to compensate for the loss incurred by propagating in the neighboring fiber spans 101. Optical amplifier stages 220 and 222 may be implemented using erbium doped fiber amplifier (EDFA) technology, semiconductor optical amplifier technology (SOA), discrete Raman amplifier technology or other optical amplifier technology. Optical amplifier stages 220 and 222 may be implemented together in a single stage. As shown in a preferred embodiment, optical amplifier stages 220 and 222 together comprise a two-stage optical amplifier.

In the preferred embodiment with the two-stage optical amplifier, a dispersion compensation module 225 may be included between the two stages. The dispersion compensator module adjusts the phase information of the optical pulses in order to compensate for the chromatic dispersion in the optical fiber while appreciating the role of optical nonlinearities in the optical fiber. The dispersion compensator module may be realized using many dispersion compensation technologies including optical fiber with appropriate dispersion characteristics, higher-order mode fiber-based dispersion compensator technology, optical etalon-based compensators, or other available technologies.

Also shown in FIG. 2 are the optical transmitters 231 and 233 and receivers 230 and 232 of the optical service channel transceivers. In a preferred embodiment, the optical service channel transceivers are 1 gigabit Ethernet (GbE) transceivers with one wavelength propagating in the A-Z direction and another wavelength propagating in the Z-A direction. In the preferred embodiment the optical service channels are outside the wavelength ranges of the data traffic. In one preferred embodiment these ranges are 1550 nm and 1530 nm or 1520 and 1610 respectively.

As shown in FIG. 2, fiber spans 101 are connected to optical couplers 202 and 208. The function of optical couplers 202 and 208 is to separate the optical service channels from the optical signals 110 and 111 on fiber spans 101. Also functionally connected to optical couplers 202 and 208 are optical coupler/decouplers 205 and 207. The function of optical couplers/decouplers 205 and 207 is to separate the two optical service channel wavelengths for the A-Z and Z-A direction onto separate fibers. In a preferred embodiment, the discrimination of this coupling is accomplished by wavelength discrimination, and optical couplers 202, 208,205 and 207 are wavelength-selective optical couplers. The optical couplers 205 and 207 are also coupled to the optical transmitters 231 and 233 and receivers 230 and 232 of the optical service channel transceivers, with each transceiver transmitting and receiving on different wavelengths. In another embodiment, couplers/decouplers 205 and 207 are accomplished by optical circulators.

Optical coupler 202 is also functionally connected to optical coupler 204 Optical coupler 204 couples incoming traffic from fiber span 101 to optical attenuator 212, and outgoing traffic from optical coupler 203 to fiber span 101 via optical coupler 202. In a preferred embodiment the discrimination of this coupling is accomplished by wavelength discrimination and optical coupler 202 and 204 are wavelength-selective optical couplers.

Optical coupler 208 is also functionally connected to optical coupler 206. Optical coupler 206 couples incoming traffic from fiber span 101 to optical attenuator 210, and outgoing traffic from optical coupler 203 to fiber span 101 via optical coupler 208. In a preferred embodiment the discrimination of this coupling is accomplished by spectral discrimination and optical couplers 206 and 208 are wavelength selective optical couplers.

Optical attenuators 210 and 212 are functionally connected to optical coupler 201. Optical coupler 201 combines the traffic from the A direction with the traffic from the Z direction so that amplification, dispersion compensation and other functions such as dynamic gain equalization are accomplished on the optical signals using the same components in a co-directional, or co-propagating manner. Thus the output of optical coupler 201 is the input to optical amplifier stage 220. The output of optical amplifier stage 220 is routed to a variable optical attenuator 221. The output of variable optical attenuator 221 is the input of dispersion compensator 225. In this preferred embodiment, the output of dispersion compensator 225 is the input of optical amplifier stage 222. Optical amplifier stage 222, in this embodiment, acts as the second stage of a two-stage optical amplifier. The variable optical attenuator 221 can be adjusted to control the overall gain of the two-stage optical amplifier. The output of optical amplifier stage 222 is the input to optical coupler 203. Optical coupler 203 separates the signals that must propagate in the Z-A direction from the optical signals that must propagate in the A-Z direction. In a preferred embodiment, the discrimination of this coupling is accomplished by spectral discrimination, and optical couplers 202 and 204 are wavelength selective optical couplers.

Since the incoming optical signals 110 and 111 input to optical attenuator 210 and optical attenuator 212 come from spans that may be of different lengths (and therefore have different amounts of attenuation), the incoming optical signals may be at significantly different power levels. The preferred method of correcting for this power variation is to use optical attenuator 210 and optical attenuator 212 to attenuate the higher power signal to the level of the lower power signal. This counterintuitive approach to engineering uneven span lengths provides an optimum equalization scheme. The variable optical attenuators 210 and 212 together with variable optical attenuator 221 within the two-stage optical amplifier comprised of stages 220 and 222 are adjusted to provide the optimal optical power levels at the inputs to fiber spans 101.

In practice, the attenuation values of variable optical attenuators 210 and 212 should be as small as possible to minimize the impact on system noise accumulation. These separate variable optical attenuators allow the single optical amplifier to be treated as two separate amplifiers. At system startup, beginning at one system endpoint, using endpoint A as an example, the variable optical attenuators at each optical amplifier site in sequence can be optimized to launch the correct optical power level into the outgoing fiber span for the A-Z optical signals by adjusting variable optical attenuators 212 and 221. When all optical amplifiers have been adjusted for the A-Z optical signals, the optical amplifiers beginning at the Z endpoint can in sequence be tuned for the Z-A optical signals by adjusting variable optical attenuator 210. If there is a case where variable optical attenuator 210 has been reduced to zero and the attenuation for the Z-A optical signals must still be decreased to achieve the desired output power at a certain optical amplifier site, the attenuation setting of variable optical attenuator 221 within the optical amplifier can be reduced, increasing the attenuation of variable optical attenuator 212 by an equal amount to maintain the same total attenuation for the A-Z optical signals.

Figure 3:
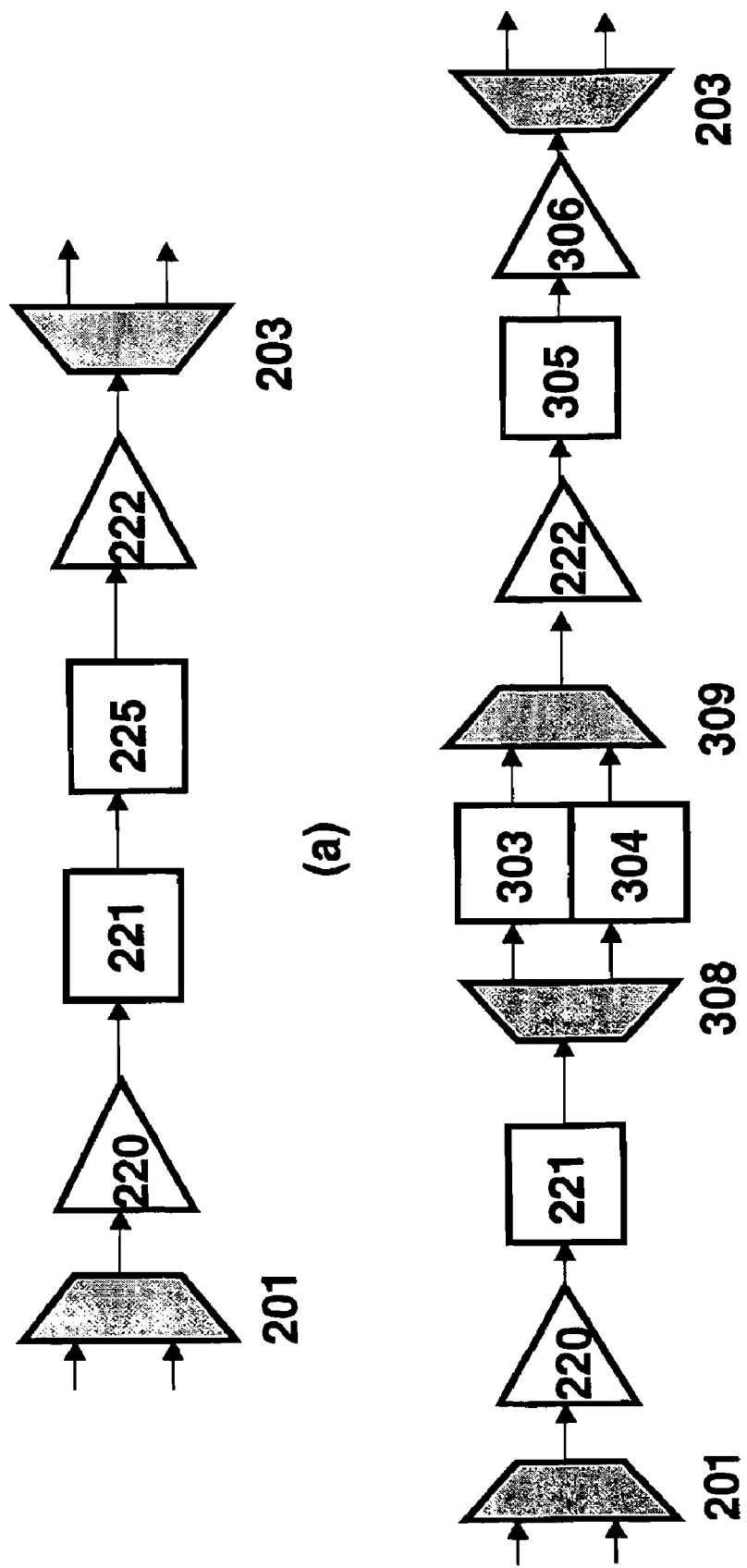
FIGS. 3(a) and 3(b) are schematic illustrations of two alternative optical amplifier implementations using either (a) a single dispersion compensator module for both A-Z and Z-A traffic or (b) separate dispersion compensation modules for A-Z and Z-A traffic to support the full duplex single fiber system in accordance with the invention.

Additional elements may be deployed between optical coupler 201 and optical coupler 203 in a manner that optical signals 110 and 111 share the same element at significant cost and size advantage. FIG. 3(a) illustrates the deployment of a standard in-line amplifier (ILA), with a shared dispersion compensation module 225 as the primary optical element between the optical amplifier stages 220 and 222. The single fiber system offers two variants of dispersion compensation. The first variant uses a single dispersion compensator 225 at standard ILA site as shown in FIG. 3 (a).

Separate dispersion compensators 303 and 304 are employed in each direction at sites with dynamic gain equalizers, optical add/drop capability or at other sites where more accurate dispersion compensation is required or where there is a change in fiber type such as SMF to NZDSF. FIG. 3(b) illustrates the use of separate dispersion compensators and will be referred to as "ILA-2." As shown in FIG. 3(b), optical attenuator 221 is functionally connected to optical coupler 309. Optical coupler 308 is functionally connected to dispersion compensator 303 for the A-Z traffic. Optical coupler 308 is also functionally connected to dispersion compensator 304 for the Z-A traffic. Dispersion compensator 303 is functionally connected to optical coupler 309. Dispersion compensator 304 is also functionally connected to optical coupler 308. Optical coupler 309 is then functionally connected to optical amplifier stage 222. A dispersion algorithm, which will be further described later, co-optimizes the dispersion map for both directions. A higher-cost system variant procedure consists of using separate dispersion compensators 303 and 304 for each direction as shown in FIG. 3(b) at all in-line amplifier sites, not just at sites with gain equalization or optical add/drop capability. This approach would allow for an independent optimization of the dispersion map in each direction for improved system performance.

ILA-2 may also have additional optical elements 305 deployed between the optical amplifier 220 and the optical coupler 203. An additional optical amplifier 306 may be deployed between the additional optical element 305 and the optical coupler 203. The position of element 305 is for illustrative purposes and does not preclude alternative placement of this element at any point between optical coupler 201 and 203.

For example, a dynamic gain equalizer may be deployed between optical coupler 201 and optical coupler 203 in order to equalize the power in the individual WDM channels. An optimal placement for this dynamic gain equalizer is shown in FIG. 3(b) as element 305 after the second stage optical amplifier 222 and before optical coupler 203. The third optical amplifier 306 compensates for the optical attenuation of the dynamic gain equalizer. In a preferred embodiment, the dynamic gain equalizer comprises a liquid crystal dynamic gain equalizer. In another preferred embodiment the dynamic gain equalizer comprises a micro-electro-mechanical machine dynamic gain equalizer. In the most generalized embodiment, the dynamic gain equalizer comprises either a channel-by-channel variable optical attenuator-based gain equalizer or a broadband gain-shape equalizer.

Another example additional optical element 305 is an optical add/drop multiplexer that may be deployed between optical coupler 201 and optical coupler 203 in order to add and drop channels at the in-line amplifier location. An optimal placement for this dynamic gain equalizer is shown in FIG. 3(b) as element 305 after the second stage optical amplifier 222 and before optical coupler 203. The amplifier 306 compensates for the optical attenuation of the add/drop multiplexer. It will be apparent to persons skilled in the art that the single-fiber architecture presented here allows the implementation without impairment of the same types of optical add/drop elements traditionally used in dual-fiber systems that are well known in the art and may be based on fixed optical filters or reconfigurable optical filters and switches.

| Reference Number | Preferred Embodiment |
| --- | --- |
| 230 & 231 | GBIC, Finisar FTR-1619-7D-55 |
| 232 & 233 | GBIC, Finisar FTR-1619-7D-53 |
| 305 | 1100 GHz DGE, JDS Uniphase, WBLWX1HL02601 |
| 201 & 203 | Blue pass filter, Oplink MWDMLB000001111 |
| 204 & 206 | Red pass filter, Oplink MWDMLR000001111 |
| 220 & 306 | High Gain EDFA, Onetta IOE 11130L-0002CL |

-continued

| Reference Number | Preferred Embodiment |
|---|---|
| 207 | CWDM filter (1550 nm), United Optronics CWDVS15500100 |
| 205 | CWDM filter (1530 nm), United Optronics CWDVS15300100 |
| 202 & 208 | C-band/L-band Filter, Cierra Photonics CBSPF 1532.681 0164 |
| 225, 303 & 304 | LEAF DCM, OFS Fitel EHS-963-L |
| 210 & 212 | 2-ch VOA array, Dicon SCD-5773-A |
| 305 | Multiplexer (Blue band), Cierra Photonics MD1001001 0129 |
| 305 | Multiplexer (Red band), Cierra Photonics MD1001002 0129 |

The dispersion management for a single-fiber system needs to take into account the propagation quality for both directions for random sets of fiber span lengths. Likewise, installation feasibility and dispersion compensator cost need to be considered.

The accumulated dispersion for the signal at a particular point in the transmission line is the sum of the dispersion values of the passed through fiber spans and dispersion compensation modules, also referred to as the "dispersion map". In a preferred embodiment, the dispersion map for both A-Z and Z-A directions can be optimized by requiring that the accumulated dispersion values at the input to all segments be approximately 0 ps/nm. With this approach, the accumulated dispersion at the segment endpoints are tightly controlled, while the accumulated dispersion at the intermediate ILA sites can be maintained within a wider acceptable range. This is especially important for terminal and add-drop sites where the individual wavelength channels are connected to equipment outside this system and should be at a known dispersion state.

Figure 4:
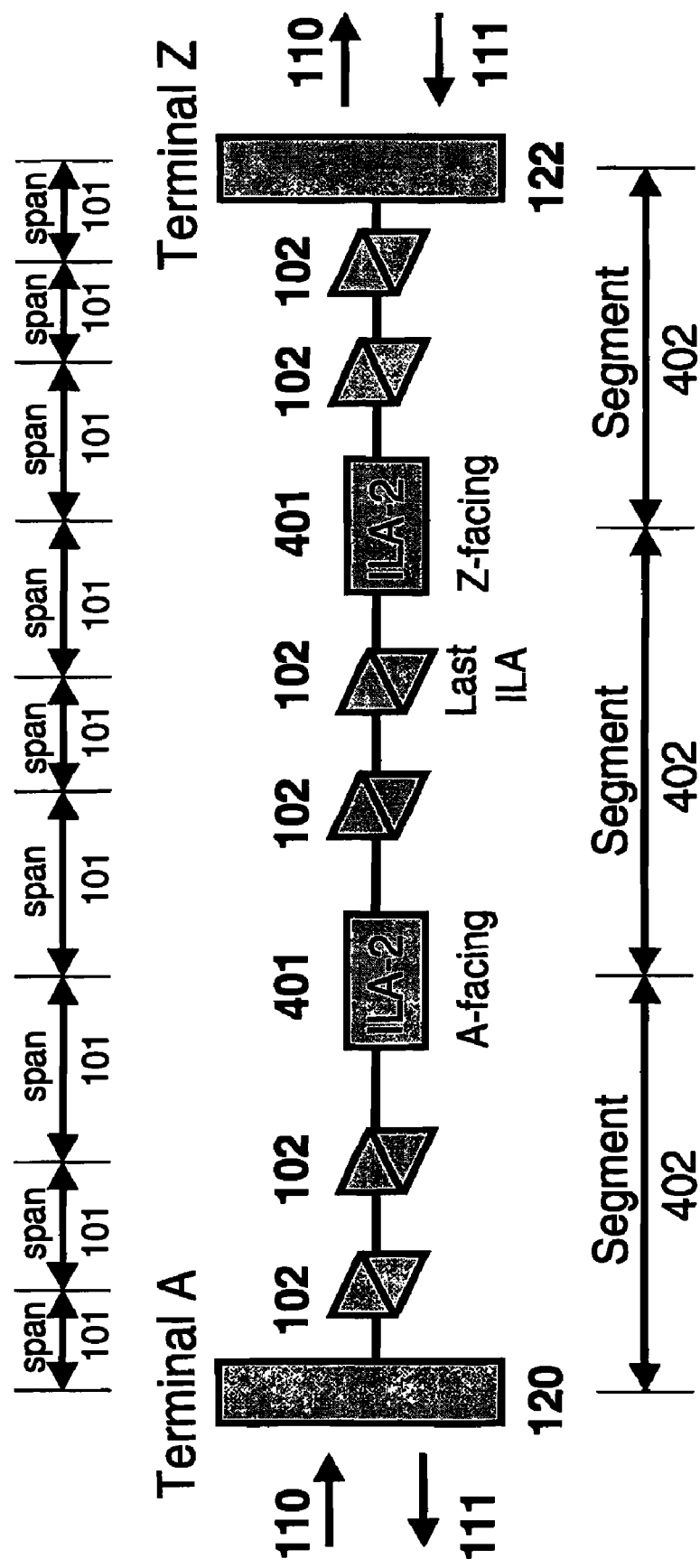
FIG. 4 is a schematic illustration of a full duplex single fiber system that is divided into segments and spans for optical power level and dispersion compensation optimization in accordance with the invention.

To facilitate the generation of this optimized dispersion map, the transmission system is divided into segments and spans, as illustrated in FIG. 4, with the endpoints of the segments being either a terminal multiplexer at the system terminal sites or the ILA-2 sites along the system. As different dispersion compensators 303 and 304 may be used for each direction at the ILA-2 sites, the accumulated dispersion can be equalized for all signals at these points. Signals then can be added or dropped if required with the appropriate accumulated dispersion. After dividing the system into segments and spans, the appropriate average accumulated dispersion can be obtained for each segment, also yielding the optimum average accumulated dispersion for the whole system.

In some systems, like that described in U.S. patent application Ser. No. 10/147,397, incorporated herein by reference, the dispersion compensation modules used to correct for the dispersion of each span are fabricated with discrete values. These discrete values are known as dispersion compensator "granularity." The dispersion compensator granularity, for example, could be equivalent to 10 km of the fiber dispersion. The advantage of this approach is that it allows a finite set of dispersion compensator part numbers to be maintained rather than obtaining modules to precisely match the required values for each fiber span, which can simplify inventory and reduce cost. The disadvantage is that the set of discrete values of compensation make it unlikely to closely match the required amount of dispersion for a given fiber span. Therefore, in practice, a DCM module is chosen which most nearly approximates the amount of compensation required for a given span.

In all systems certain optical non-linearity's in the fiber need to be accounted for in each span. The non-linearity's are accounted for in the invention by allowing for a predetermined optical amount of uncompensated dispersion. The uncompensated dispersion is referred to as "under-compensation." Under-compensation is a design specification for the system. Typical values for under-compensation in each span range from 0 ps/nm to 100 ps/nm.

A method is described for determining the optimal DCMs and "under-compensation" at each ILA and ILA-2 site considering the granularity of the available DCMs for a single-fiber full-duplex optical transmission system to yield an optimum average accumulated dispersion for the whole system.

Consider a segment with N spans as depicted in FIG. 4. For system installation and dispersion management, the system is divided into segments between either a terminal multiplexer at the system endpoints and a higher-functionality optical amplifier sites (ILA-2s), or between two ILA-2 sites. Consider the dispersion compensation for one segment. Starting for example at one ILA-2 site (referred to as the "A-facing" ILA-2) and working in the A-Z direction, the dispersion compensator 225 at each ILA 102 site in turn is determined according to the preceding fiber span dispersion in the following manner.

The magnitude of the target dispersion compensator value for each span is the dispersion of the previous fiber span minus the specified amount of per-span under-compensation plus a "carry over" value from the previous span. For example, a fiber span that is 100 km in length consisting of standard single-mode fiber (SSMF) with dispersion of +17 ps/nm-km at 1550 nm, and a system design calling for a 30 ps/nm per-span under-compensation value, the target magnitude of dispersion compensation would be (100 km×17 ps/nm-km−30 ps/nm) or 1670 ps/nm. Note that the dispersion of the fiber and the dispersion compensator are by definition opposite in sign, so the target DCM should have a dispersion value of −1670 ps/nm.

A DCM is then chosen which most nearly approximates this target value, considering the specified granularity of the available DCM units. Assuming a DCM granularity equal to 10 km of SSMF fiber, the granularity is (10 km×−17 ps/nm) or −170 ps/nm, and the inventory of DCMs would thus consist of modules with dispersion values equal to integer multiples of −170 ps/nm. With this granularity and the target dispersion compensation from above of −1670 ps/nm, the closest actual DCM value would be (10×−170 ps/nm) or −1700 ps/nm. The resulting error between the required dispersion compensation value for a span and the actual value of the available dispersion compensator with finite granularity is defined as the "carry-over" dispersion value. The "carry over" dispersion value is added to the dispersion of the next span to determine the required dispersion compensator 225 at the next ILA site. In this example, the carry-over dispersion value is ((−1670 ps/nm)−(−1700 ps/nm)) equals −30 ps/nm. To be clear, the "per-span under-compensation" value is a system specification designed for optimum optical transmission performance, while the "carry-over dispersion of each span is a measure of the imperfection of a dispersion map based on DCM units with finite granularity.

Referring again to FIG. 4 at the "last ILA" before the "Z-facing" ILA-2 of the segment bordering (the second to last span of the segment) the value of the dispersion compensator is determined in a slightly different way. The dispersion of the following span $D_N$ is added to the dispersion of the preceding span $D_{N-1}$. Then, the dispersion values of all spans in the segment $D_i$ are added and divided by the number of spans N.

This average dispersion is subtracted from the previously calculated sum, yielding the target dispersion to be compensated as:

$$D_{comp} = D_{N-1} + D_N - \frac{1}{N}\sum_{i=1}^{N} D_i, \quad \text{(Eq. 1)}$$

where $D_{comp}$, is the dispersion value to be compensated, $D_i$ is the dispersion of the i-th fiber span in the segment, and N is the number of fiber spans in the segment. This procedure minimizes the average dispersion error in each segment for both directions of propagation. This dispersion value is then also corrected for the carry-over dispersion from the previous span and the required under-compensation. The carry-over from this site is also calculated differently, as the sum of the dispersion of the previous span plus the value of the chosen dispersion compensator 225 minus the required under-compensation.

At the "Z-facing" ILA-2, the dispersion compensator 303 for the A-Z installation direction is determined based on the dispersion value of the last span before the Z-facing ILA-2 site, the under-compensation specification, and the carry-over value from the previous ILA. The resulting carry-over value is used as a carry-over value for the first ILA of the next segment. Finally, the DCM 304 for the Z-A direction at the "A-facing" ILA-2 site is determined. The sum of all installed ILA dispersion compensators 225 (DCM$_i$) in the segment is subtracted from the sum of the required dispersion values of all fiber spans of the segment (D$_i$) including the under-compensation (D$_{uc}$) to determine the Z-A dispersion compensator 304 for the "A-Facing" ILA-2 of this segment. In this procedure, the resulting carry-over dispersion value from the DCM selection for dispersion compensator 304 is not carried over to another span in equation form:

$$D_{comp} = \sum_{i=1}^{N-1} DCM_i + \sum_{i=1}^{N}(D_i - D_{UC}),$$

where $D_{comp}$ is the dispersion value to be compensated, DCM$_i$ is the value of the ith dispersions compensator, D$_i$ is the dispersion value of the ith span and D$_{uc}$ is the specified under-compensation for the span.

In summary, when working in the A-Z direction, this process yields for one segment the dispersion compensator 225 values for all ILA sites, the Z-A dispersion compensator 304 for the beginning ILA-2 of the segment, and the A-Z dispersion compensator 303 for the ending ILA-2 of the segment. This procedure is repeated for all segments of the system. In an alternative embodiment that provides higher accuracy, the DCM 304 values for all segments can be determined after the other DCM elements of all segments in a system have been determined. In this embodiment, after determining the DCM values in the A-Z direction, the procedure for determining the DCM 304 units begins at the Z Terminal, working back towards the A terminal. The DCM 304 is determined as above, with the addition that the carry-over value from each DCM 304 (D$_{co}$) is added to the DCM 304 value at the following ILA-2 site moving in the Z-A direction.

$$D_{comp} = \sum_{i=1}^{N-1} DCM_i + \sum_{i=1}^{N}(D_i - D_{UC}) + D_{CO},$$

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method for compensating for dispersion in an optical transport system that includes a segment having first, second and third fiber spans, the method comprising:
   determining a first dispersion compensation value for a first dispersion compensator coupled between the first and second fiber spans, wherein the first dispersion compensation value is based on dispersion exhibited by the first fiber span;
   determining a second dispersion compensation value for a second dispersion compensator coupled between the second and third fiber spans, wherein the second dispersion value is based on dispersion exhibited by the second fiber span;
   determining a third dispersion compensation value for a third dispersion compensator coupled to the third fiber span, wherein the third dispersion compensation value is based on dispersion exhibited by the third fiber span;
   determining a fourth dispersion compensation value for a fourth dispersion compensator coupled to the first fiber span, wherein the fourth dispersion compensation value is based on a sum of the first and second dispersion compensation values and a sum of the dispersion exhibited by the first, second and third fiber spans; and
   employing the first, second, third, and fourth dispersion compensators in the optical transport system, wherein the determined first, second, third and fourth dispersion compensation values are used to compensate for dispersion exhibited by the segment.

2. The method of claim 1, wherein the first dispersion compensation value is further based on a specified under-compensation value and a carry over value.

3. The method of claim 2, wherein the first dispersion compensation value is equal to the dispersion exhibited by the first fiber span minus the specified under-compensation value plus the carry over value.

4. The method of claim 1, wherein the second dispersion compensation value is further based on dispersion exhibited by the third fiber span and an average dispersion exhibited by the first, second and third fiber spans.

5. The method of claim 4, wherein the second dispersion compensation value is equal to the dispersion exhibited by the second fiber span plus the dispersion exhibited by the third fiber span minus the average dispersion exhibited by the first, second and third fiber spans.

6. The method of claim 1, wherein the third dispersion compensation value is further based on a specified under-compensation value and a carry over value.

7. The method of claim 6, wherein the third dispersion compensation value is equal to the dispersion exhibited by the third fiber span minus the specified under-compensation value plus the carry over value.

8. The method of claim 1, wherein the fourth dispersion compensation value is further based on a specified under-compensation value.

9. The method of claim 8, wherein the fourth dispersion compensation value is equal to the sum of the first and second dispersion compensation values minus the sum of the dispersion exhibited by the first, second and third fiber spans less the specified under-compensation value.

10. The method of claim 1, further comprising providing the first, second, third and fourth dispersion compensators.

11. The method of claim 1, further comprising installing the first, second, third and fourth dispersion compensators in the optical transport system.

12. The method of claim 1, wherein the optical transport system is configured to support co-direction signal propagation, the wherein the first and second dispersion compensators are each configured to provide co-directional dispersion compensation for a first optical signal propagating in a first direction and a second optical signal propagating in a second, opposite direction.

13. The method of claim 1, wherein the third and fourth dispersion compensators are each configured to provide dispersion compensation for a optical signal propagating in a first direction.

14. An optical transport system defining a segment that includes first, second and third fiber spans, the optical transport system comprising:
   a first dispersion compensator coupled between the first and second fiber spans, wherein a first dispersion compensation value of the first dispersion compensator is based on dispersion exhibited by the first fiber span;
   a second dispersion compensator coupled between the second and third fiber spans, wherein a second dispersion compensation value of the second dispersion compensator is based on dispersion exhibited by the second fiber span;
   a third dispersion compensator coupled to the third fiber span, wherein a third dispersion compensation value of the third dispersion compensator is based on dispersion exhibited by the third fiber span; and
   a fourth dispersion compensator coupled to the first fiber span, wherein a fourth dispersion compensation value of the fourth dispersion compensator is based on a sum of the first and second dispersion compensation values and a sum of the dispersion exhibited by the first, second and third fiber spans.

15. The optical transport system of claim 14, wherein the first dispersion compensation value is further based on a specified under-compensation value and a carry over value.

16. The optical transport system of claim 15, wherein the first dispersion compensation value is equal to the dispersion exhibited by the first fiber span minus the specified under-compensation value plus the carry over value.

17. The optical transport system of claim 14, wherein the second dispersion compensation value is further based on dispersion exhibited by the third fiber span and an average dispersion exhibited by the first, second and third fiber spans.

18. The optical transport system of claim 17, wherein the second dispersion compensation value is equal to the dispersion exhibited by the second fiber span plus the dispersion exhibited by the third fiber span minus the average dispersion exhibited by the first, second and third fiber spans.

19. The optical transport system of claim 14, wherein the third dispersion compensation value is further based on a specified under-compensation value and a carry over value.

20. The optical transport system of claim 19, wherein the third dispersion compensation value is equal to the dispersion exhibited by the third fiber span minus the specified under-compensation value plus the carry over value.

21. The optical transport system of claim 14, wherein the fourth dispersion compensation value is further based on a specified under-compensation value.

22. The optical transport system of claim 21, wherein the fourth dispersion compensation value is equal to the sum of the first and second dispersion compensation values minus the sum of the dispersion exhibited by the first, second and third fiber spans less the specified under-compensation value.

23. The optical transport system of claim 14, wherein the first and second dispersion compensators are each configured to provide co-directional dispersion compensation for a first optical signal propagating in a first direction and a second optical signal propagating in a second, opposite direction.

24. The optical transport system of claim 14, wherein the third and fourth dispersion compensators are each configured to provide dispersion compensation for a optical signal propagating in a first direction.

25. An optical transport system defining a segment that includes first, second and third fiber spans, the optical transport system comprising:
   a first means for providing dispersion compensation coupled between the first and second fiber spans, wherein a first dispersion compensation value of the first means is based on dispersion exhibited by the first fiber span;
   a second means for providing dispersion compensation coupled between the second and third fiber spans, wherein a second dispersion compensation value of the second means is based on dispersion exhibited by the second fiber span;
   a third means for providing dispersion compensation coupled to the third fiber span, wherein a third dispersion compensation value of the third means is based on dispersion exhibited by the third fiber span; and
   a fourth means for providing dispersion compensation coupled to the first fiber span, wherein a fourth dispersion compensation value of the fourth means is based on a sum of the first and second dispersion compensation values and a sum of the dispersion exhibited by the first, second and third fiber spans.

26. The optical transport system of claim 25, wherein the first dispersion compensation value is further based on a specified under-compensation value and a carry over value.

27. The optical transport system of claim 26, wherein the first dispersion compensation value is equal to the dispersion exhibited by the first fiber span minus the specified under-compensation value plus the carry over value.

28. The optical transport system of claim 25, wherein the second dispersion compensation value is further based on dispersion exhibited by the third fiber span and an average dispersion exhibited by the first, second and third fiber spans.

29. The optical transport system of claim 28, wherein the second dispersion compensation value is equal to the dispersion exhibited by the second fiber span plus the dispersion exhibited by the third fiber span minus the average dispersion exhibited by the first, second and third fiber spans.

30. The optical transport system of claim 25, wherein the third dispersion compensation value is further based on a specified under-compensation value and a carry over value.

31. The optical transport system of claim 30, wherein the third dispersion compensation value is equal to the dispersion exhibited by the third fiber span minus the specified under-compensation value plus the carry over value.

32. The optical transport system of claim 25, wherein the fourth dispersion compensation value is further based on a specified under-compensation value.

33. The optical transport system of claim 32, wherein the fourth dispersion compensation value is equal to the sum of the first and second dispersion compensation values minus the sum of the dispersion exhibited by the first, second and third fiber spans less the specified under-compensation value.

34. The optical transport system of claim 25, wherein the first means and the second means are each configured to provide co-directional dispersion compensation for a first optical signal propagating in a first direction and a second optical signal propagating in a second, opposite direction.

35. The optical transport system of claim 34, wherein the third means and the fourth means are each configured to provide dispersion compensation for a optical signal propagating in a first direction.

* * * * *